US011329487B2

(12) United States Patent
Hart et al.

(10) Patent No.: US 11,329,487 B2
(45) Date of Patent: May 10, 2022

(54) SYSTEM AND METHOD FOR CONTROLLING A POWER GENERATING SYSTEM

(71) Applicant: General Electric Renovables Espana, S.L, Barcelon (ES)

(72) Inventors: Patrick Hammel Hart, Ballston Lake, NY (US); Charles Joseph Kosuth, Albany, NY (US); Alina Fatima Moosvi, Ballston Spa, NY (US); Alev Akbulut, Rheine (DE); Enno Ubben, Steinfurt (DE)

(73) Assignee: General Electric Renovables Espana, S.L., Barcelona (ES)

( * ) Notice: Subject to any disclaimer, the term of this patent is extended or adjusted under 35 U.S.C. 154(b) by 80 days.

(21) Appl. No.: 16/911,476

(22) Filed: Jun. 25, 2020

(65) Prior Publication Data
US 2021/0408798 A1    Dec. 30, 2021

(51) Int. Cl.
*H02J 3/38*         (2006.01)
*H02J 13/00*        (2006.01)
*F03D 9/25*         (2016.01)

(52) U.S. Cl.
CPC .............. *H02J 3/381* (2013.01); *F03D 9/257* (2017.02); *H02J 13/00002* (2020.01); *H02J 13/00006* (2020.01); *H02J 2203/20* (2020.01); *H02J 2300/22* (2020.01); *H02J 2300/28* (2020.01)

(58) Field of Classification Search
CPC ................. H02J 3/381; H02J 13/00002; H02J 13/00006; H02J 2203/20; H02J 2300/22; H02J 2300/28; F03D 9/257
See application file for complete search history.

(56) References Cited

U.S. PATENT DOCUMENTS

| | | | | |
|---|---|---|---|---|
| 7,606,638 B2* | 10/2009 | Fortmann | ............... | F03D 9/257 700/287 |
| 7,839,024 B2* | 11/2010 | Cardinal | ................. | H02J 3/383 307/84 |
| 8,041,465 B2* | 10/2011 | Larsen | .................... | F03D 9/255 700/287 |
| 8,447,434 B1* | 5/2013 | Harris | ....................... | H02J 3/36 700/286 |

(Continued)

OTHER PUBLICATIONS

European Search Report for EP Application No. 21181252.4, dated Nov. 19, 2021.

*Primary Examiner* — Pedro J Cuevas
(74) *Attorney, Agent, or Firm* — Dority & Manning, P.A.

(57) ABSTRACT

A system and method are provided for controlling a power generating system having at least one power generating subsystem connected to a point of interconnection (POI). Accordingly, the subsystem controller of the power generating subsystem obtains a first data signal indicative of an electrical parameter at the POI and a second data signal indicative of the electrical parameter at the generating subsystem. The second data signal has a higher fidelity than the first data signal. The second data signal is utilized by the subsystem controller to generate a first modeled value for the electrical parameter at the POI which compensates for the lower-fidelity first data signal. The subsystem controller generates a setpoint command for the power generating subsystem based, at least in part, on the first modeled value for the electrical parameter.

20 Claims, 5 Drawing Sheets

(56) References Cited

U.S. PATENT DOCUMENTS

| | | | |
|---|---|---|---|
| 9,046,077 B2* | 6/2015 | Kirchner | H02J 3/18 |
| 9,347,429 B2* | 5/2016 | Nielsen | F03D 7/0284 |
| 9,881,033 B2* | 1/2018 | Boardman | G05B 15/02 |
| 9,917,442 B2* | 3/2018 | Beauregard | H04L 67/34 |
| 10,027,118 B2* | 7/2018 | Ubben | H02J 3/1821 |
| 10,428,797 B2* | 10/2019 | Scott | F03D 7/048 |
| 10,459,411 B2* | 10/2019 | Bernheim | H02J 50/80 |
| 10,509,873 B2* | 12/2019 | Hale | G06F 30/20 |
| 10,587,310 B1* | 3/2020 | Bennett | H01P 3/16 |
| 10,635,058 B2* | 4/2020 | Sanders | H02J 3/388 |
| 10,886,972 B2* | 1/2021 | Bennett | H01P 3/02 |
| 10,989,169 B1* | 4/2021 | Kosuth | F03D 7/028 |
| 11,144,858 B2* | 10/2021 | Fife | H02J 3/004 |
| 11,177,657 B1* | 11/2021 | Khatib | H02J 3/46 |
| 11,196,798 B2* | 12/2021 | Li | H04L 63/083 |
| 2003/0227172 A1* | 12/2003 | Erdman | F03D 7/048 |
| | | | 290/44 |
| 2010/0094474 A1* | 4/2010 | Larsen | F03D 9/257 |
| | | | 700/287 |
| 2010/0195357 A1 | 8/2010 | Fornage et al. | |
| 2012/0101643 A1* | 4/2012 | Kirchner | H02J 3/50 |
| | | | 700/287 |
| 2015/0127685 A1* | 5/2015 | Boardman | G06F 16/211 |
| | | | 707/792 |
| 2015/0267683 A1* | 9/2015 | Ubben | F03D 9/257 |
| | | | 290/44 |
| 2015/0295529 A1* | 10/2015 | Rose, Jr. | F03D 9/00 |
| | | | 290/44 |
| 2016/0043549 A1* | 2/2016 | Beauregard | H04L 67/34 |
| | | | 700/286 |
| 2017/0338652 A1* | 11/2017 | Ubben | H02J 3/386 |
| 2019/0155263 A1* | 5/2019 | Celia | G06Q 30/0278 |
| 2020/0204208 A1* | 6/2020 | Bennett | H04B 3/542 |
| 2020/0408806 A1* | 12/2020 | Bhargava | G01Q 60/38 |
| 2021/0029193 A1* | 1/2021 | Li | H04L 63/083 |
| 2021/0158225 A1* | 5/2021 | Mimaroglu | H02J 13/00002 |
| 2021/0273858 A1* | 9/2021 | Radovanovic | H04L 41/12 |
| 2021/0279643 A1* | 9/2021 | Koduru | G06N 5/003 |
| 2021/0281077 A1* | 9/2021 | Cai | H02J 3/004 |
| 2021/0297534 A1* | 9/2021 | Jia | H04N 7/152 |
| 2021/0328457 A1* | 10/2021 | Dong | G01R 21/1331 |
| 2021/0382394 A1* | 12/2021 | Levinson | G03F 7/7085 |

* cited by examiner

SYSTEM AND METHOD FOR CONTROLLING A POWER GENERATING SYSTEM

FIELD

The present disclosure relates in general to power generating systems, and more particularly to systems and methods for controlling power generating systems having power generating subsystems.

BACKGROUND

Renewable power is considered one of the cleanest, most environmentally friendly energy sources presently available, and power generating facilities which include renewable power assets have gained increased attention in this regard. One example of such a renewable power asset is a wind turbine. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple such wind turbine generators that are operable to supply power to a transmission system providing power to an electrical grid.

In modern renewable power applications, multiple power generating subsystems, such as multiple wind farms, may be coupled together at a point of interconnection (POI), such as a POI with an electrical grid. As interest in renewable power has increased, the number of power generating subsystems regulated at the single POI has increased. As a result, interactions between the multiple power generating subsystems has increased such that the output of one power generating subsystem may affect the other power generating subsystems coupled to the same POI. Accordingly, efficient regulation of each of the power generating subsystems may require accurate and timely collection of data concerning electrical parameters at the POI.

One approach for regulating the power generating subsystems may be to obtain direct measurement of the electrical parameters at the POI. However, in many instances, the POI is a component of the electrical grid, therefore, installation of sensors by the power generating subsystem operators may not be permitted. Accordingly, information concerning the electrical parameters of the POI may be provided by the POI operator, with the power generating subsystem operators having little to no control over the fidelity of the information received from the POI operator. Accordingly, the information received from POI operator may be of a lower fidelity than would otherwise be desirable for the efficient regulation of each power generating subsystem. As such, it is desirable to facilitate the efficient regulation of each power generating subsystem utilizing the low-fidelity information regarding the electrical parameters at the POI.

An additional approach for managing the effect of one power generating subsystem on the remaining power generating subsystems coupled to the POI may be through the establishment of communicative links between the power generating subsystems. In such a configuration, each of the power generating subsystems may communicate information concerning the electrical parameters at the power generating subsystem to other connected power generating subsystems. These inputs may then be combined to determine the electrical parameters at the POI. However, such communicative links increase may result in increased costs, require significant coordination between power generating subsystem owners, and may reduce the security of each generating subsystems. Accordingly, it is desirable to facilitate the efficient regulation of each of the power generating subsystems without requiring the sharing of electrical parameter information between the power generating subsystems.

Thus, the art is continuously seeking new and improved systems and methods that address the aforementioned issues. As such, the present disclosure is directed to systems and methods for controlling a power generating system based on electrical parameter information at the POI.

BRIEF DESCRIPTION

Aspects and advantages of the invention will be set forth in part in the following description, or may be obvious from the description, or may be learned through practice of the invention.

In one aspect, the present disclosure is directed to a method for controlling a power generating system. The power generating system may include at least one power generating subsystem connected to a POI. The method may include obtaining, with the subsystem controller of the power generating subsystem, a first data signal indicative of an electrical parameter at the POI. The first data signal may have a first data signal fidelity. The method may also include obtaining, with the subsystem controller, a second data signal indicative of the electrical parameter at the generating subsystem. The second data signal may have a second signal fidelity that is higher than the first signal fidelity. Additionally, the method may include generating, with the subsystem controller, a first modeled value for the electrical parameter at the POI the higher-fidelity second data signal to compensate for the lower-fidelity first data signal. Further, the method may include generating, with the subsystem controller, a setpoint command for the power generating subsystem based, at least in part, on the first modeled value for the electrical parameter.

In an embodiment, generating the first modeled value for the electrical parameter may include determining, with the subsystem controller, a difference between a value of the first data signal and a value of the second data signal. The method may also include filtering, with the subsystem controller, the difference to generate a correlation value. Additionally, the correlation value may be added to the value for the electrical parameter indicated by the second data signal to establish the first modeled value for the electrical parameter.

In an additional embodiment, the power generating subsystem(s) may be a first power generating subsystem. The power generating system may include a second power generating subsystem connected to the POI. The method may include obtaining the first data signal with the subsystem controller of the second power generating subsystem. Additionally, the method may include obtaining, with the subsystem controller of the second power generating subsystem, a third data signal indicative of the electrical parameter at the second generating subsystem. The third data signal having a third signal fidelity. The method may also include generating, with the subsystem controller for the second power generating subsystem, a second modeled value for the electrical parameter at the POI by utilizing the higher-fidelity third data signal to compensate for the lower-fidelity first data signal. Further, the method may include generating, with the subsystem controller for the second power generating subsystem, a setpoint command for the second power generating subsystem based at least in part on the second modeled value for the electrical parameter.

In a further embodiment the first and second power generating subsystems may not be communicatively coupled with regards to the second and third data signals such that the third data signal is unknown to the first power generating subsystem and the second data signal is unknown to the second power generating subsystem.

In an embodiment, the method may also include establishing a communication airgap between the first and second power generating subsystems. Establishing the communication airgap may enhance a cybersecurity posture of the first and second power generating subsystems relative to communicatively coupled power generating subsystems.

In an additional embodiment, the power generating subsystem(s) may include a wind farm and the first data signal may be obtained from a electrical grid.

In a further embodiment, the power generating subsystem(s) may include at least one wind turbine of a wind farm, and the first data signal may be obtained from the wind farm.

In an embodiment, the method may include comparing the first data signal to at least one data validity parameter. The method may also include disregarding the first data signal when the comparison indicates the first data signal is invalid.

In an additional embodiment, the first and second signal fidelities may include a measure of a refresh rate, a sensor accuracy, a sensor resolution, and/or a communication delay.

In a further embodiment, the electrical parameter may include voltage, current, power, and/or frequency.

In another aspect, the present disclosure is directed to a system for controlling a power generating system. The system may include the power generating subsystem(s) connected to a POI. The system may also include a subsystem controller of the power generating subsystem(s). The subsystem controller may include at least one processor configured to perform a plurality of operations. The plurality of operations may include obtaining a first data signal indicative of an electrical parameter at the POI. The first data signal may have a first signal fidelity. The plurality of operations may also include obtaining a second data signal indicative of the electrical parameter at the generating subsystem. The second data signal may have a second signal fidelity that is higher than the first signal fidelity. Additionally, the plurality of operations may include generating a first modeled value for the electrical parameter at the POI by utilizing the higher-fidelity second data signal to compensate for the lower-fidelity first data signal. Further, the plurality of operations may include generating a setpoint command for the power generating subsystem based, at least in part, on the first modeled value for the electrical parameter. It should be understood that the system may further include any of the additional steps and/or features described herein.

In another aspect, the present disclosure is directed to method for controlling a wind farm. The wind farm may include at least a first wind turbine and a second wind turbine connected to a POI. The method may include obtaining, with a subsystem controller of each wind turbine, a first data signal indicative of an electrical parameter at the POI. The first data signal may have a first signal fidelity. The method may include obtaining, with the subsystem controller of the first wind turbine, a second data signal indicative of the electrical parameter at the first wind turbine. The second data signal may have a second signal fidelity that is higher than the first signal fidelity. Additionally, the method may include obtaining, with the subsystem controller of the second wind turbine, a third data signal indicative of the electrical parameter at the second wind turbine. The third data signal may have a third signal fidelity that is higher than the first signal fidelity. The first and second wind turbines may not be communicatively coupled with regards to the first and third data signals such that the third data signal is unknown to the first wind turbine and the second data signal is unknown to the second wind turbine. Further, the method may include generating, with the subsystem controller of the first wind turbine, a first modeled value for the electrical parameter at the point of interconnection by utilizing the higher-fidelity second data signal to compensate for the lower-fidelity first data signal. Additionally, the method may include generating, with the subsystem controller for the second wind turbine, a second modeled value for the electrical parameter at the point of interconnection by utilizing the higher-fidelity third data signal to compensate for the lower-fidelity first data signal. The method may also include generating, with the subsystem controller for the first wind turbine, a setpoint command based, at least in part, on the first modeled value for the electrical parameter. Additionally, the method may include generating, with the subsystem controller of the second wind turbine, a setpoint command based at least in part on the second modeled value for the electrical parameter. It should be understood that the system may further include any of the additional steps and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
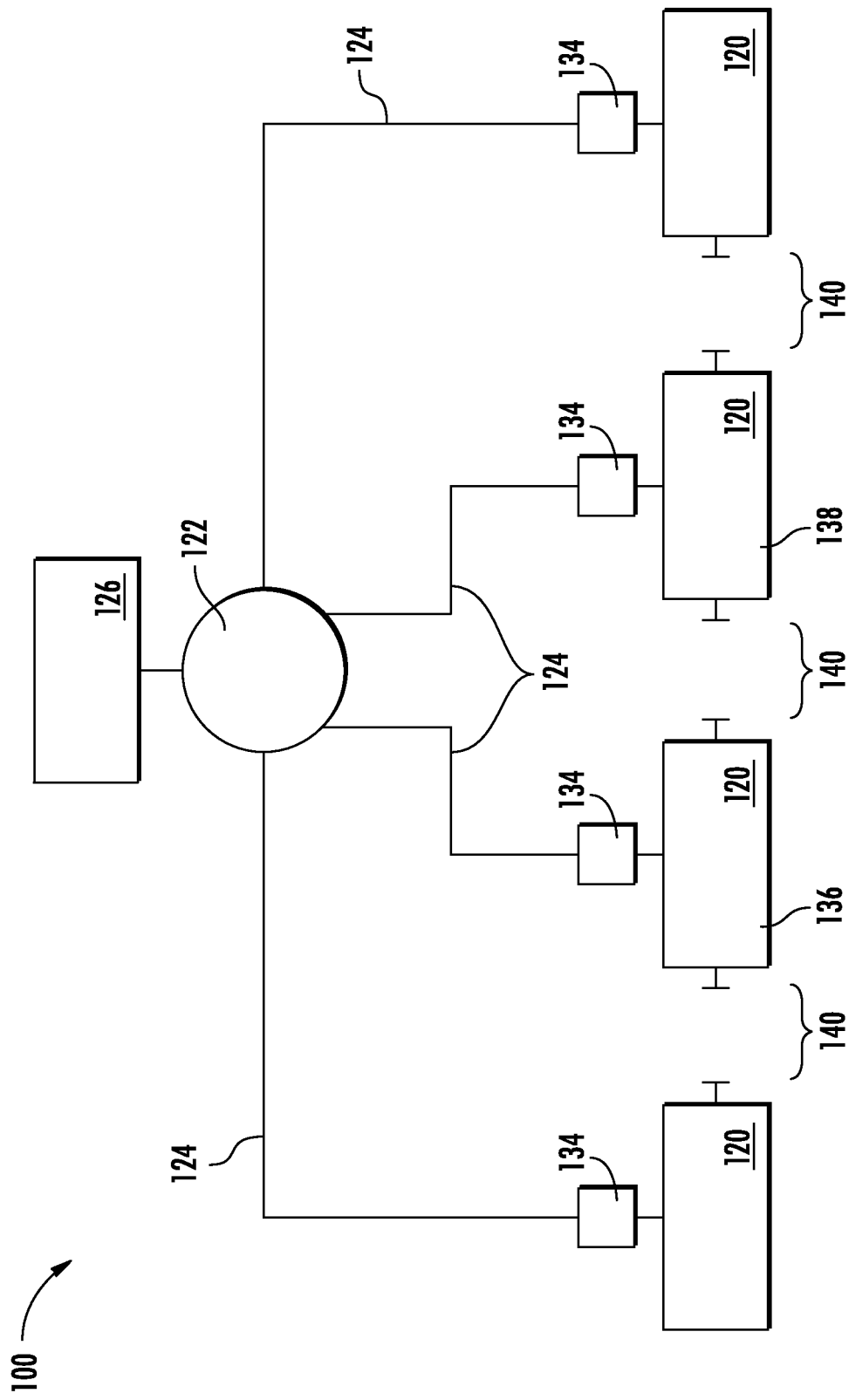
FIG. 1 illustrates a schematic diagram of a power generating system according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The term "coupled" and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Generally, the present disclosure is directed to systems and methods for controlling a power generating system having a plurality of power generating subsystems connected to an electrical grid at a point of interconnection (POI). In particular, the present disclosure may include a system and method which may facilitate the efficient operation of the power generating subsystems utilizing a low-fidelity electrical parameter signal from the POI as a baseline underpinning the control operations. Accordingly, the systems and methods presented herein may utilize high-fidelity electrical parameter signals obtained from the power generating subsystems to overcome the undesirable fidelity of the low-fidelity electrical parameter signal. Specifically, the systems and methods may utilize the high-fidelity signal and the low-fidelity signal to model a signal from the POI having sufficient fidelity. The modeled signal may be used to control each of the power generating subsystems. As such, the low-fidelity signal broadcast from the electrical grid may serve as baseline facilitating the asynchronous control of a number of power generating subsystems without requiring communication or coordination between the power generating subsystems.

Referring now to the drawings, FIG. 1 illustrates a schematic diagram of one embodiment a power generating system 100 according to the present disclosure. As depicted in FIG. 1, in an embodiment, the power generating system 100 may include at least one power generating subsystem 120 connected to a POI 122 via a communication link 124. For example, in the illustrated embodiment, the power generating system 100 includes four power generating subsystems 120 connected to the POI 122. In another embodiment, the power generating system 100 may include more than four or less than four power generating subsystems 120. Further, in such embodiments, the POI 122 may be the point at which the power generating subsystems 120 are electrically coupled to an electrical grid 126.

Figure 2:
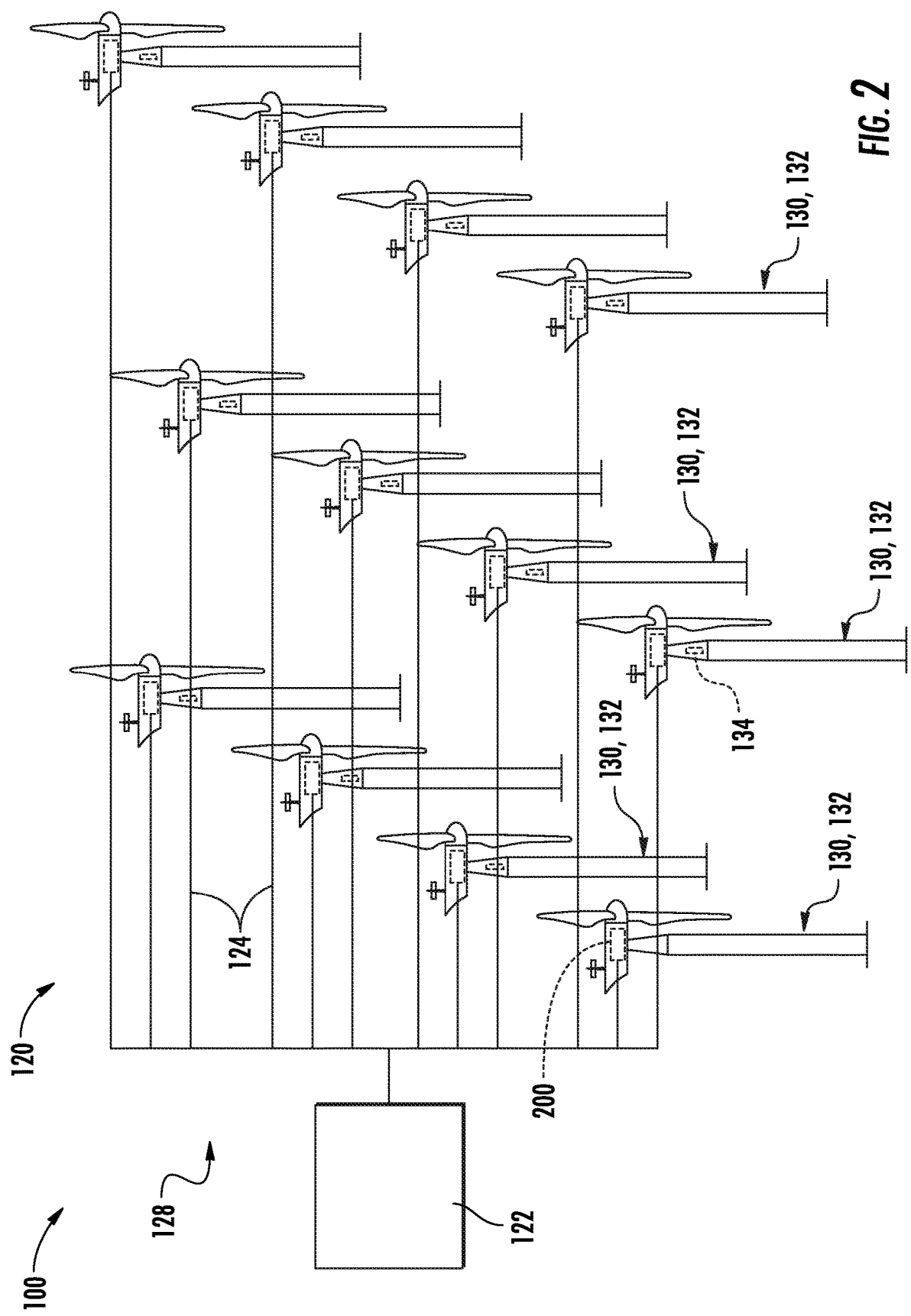
FIG. 2 illustrates a schematic diagram of a wind farm having a plurality of wind turbines according to the present disclosure.

Referring now to FIG. 2, in an embodiment, the power generating subsystem(s) 120 may be configured as a power generating facility 128, such as a wind farm. However, in additional embodiments, the power generating facility 128 may be any other suitable power generating facility, such as a hydro-electric plant, a solar power plant, an energy storage plant, a fossil fuel generator site, and/or a combination thereof, such as a hybrid power generation facility. In an embodiment, as shown, the power generating facility 128 may include a plurality of the power generating assets 130 as described herein, such as a plurality of wind turbines 132. For example, as shown in the illustrated embodiment, the power generating facility 128 may include twelve power generating assets 130. However, in other embodiments, the power generating facility 128 may include any other number of power generating assets 130, such as less than twelve power generating assets 130 or greater than twelve power generating assets 130. It should be appreciated that the power generating facilities 128 may be coupled to the POI 122 via communication links 124.

Figure 3:
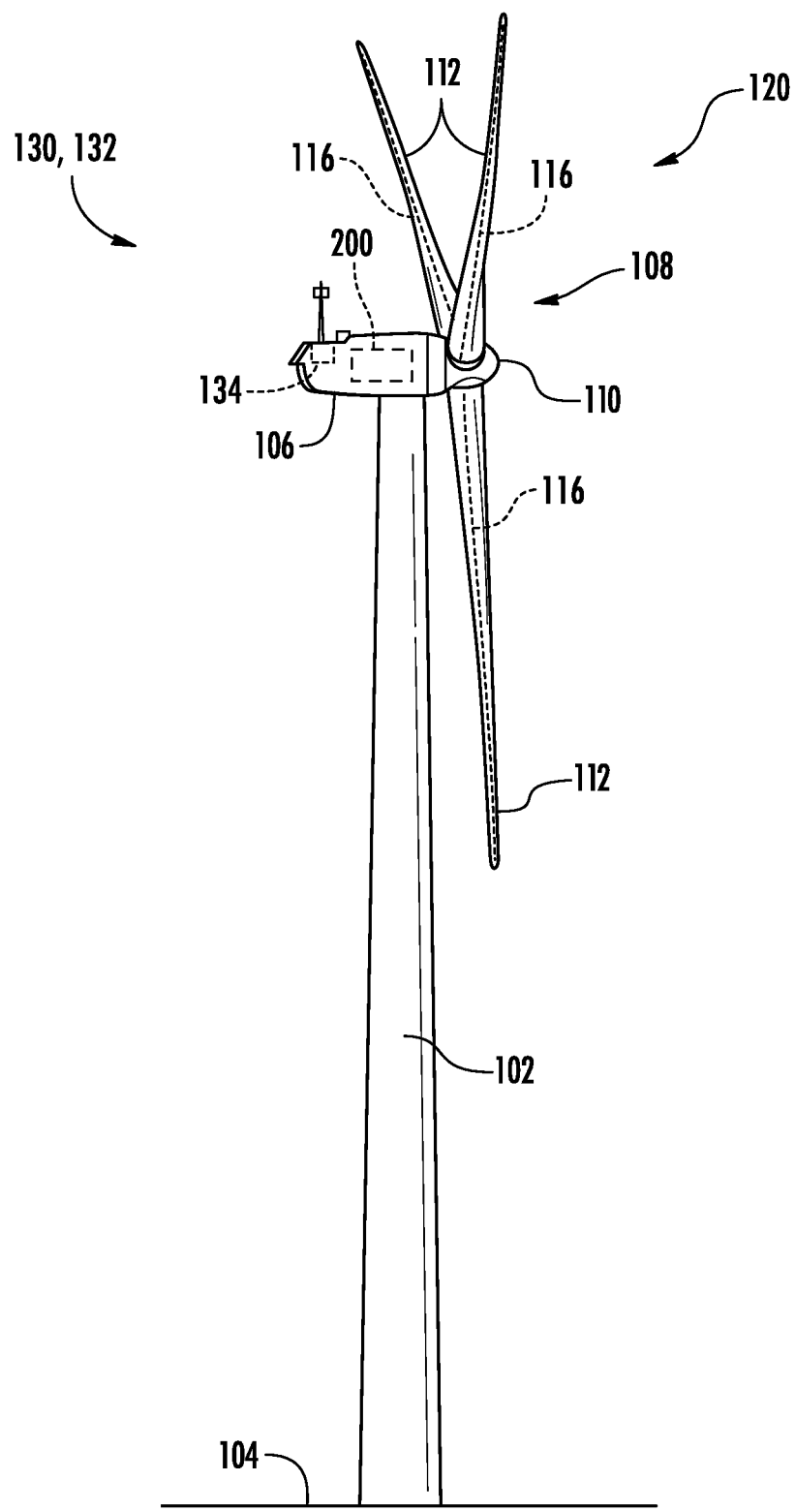
FIG. 3 illustrates a perspective view of one embodiment of a wind turbine according to the present disclosure.
Figure 4:
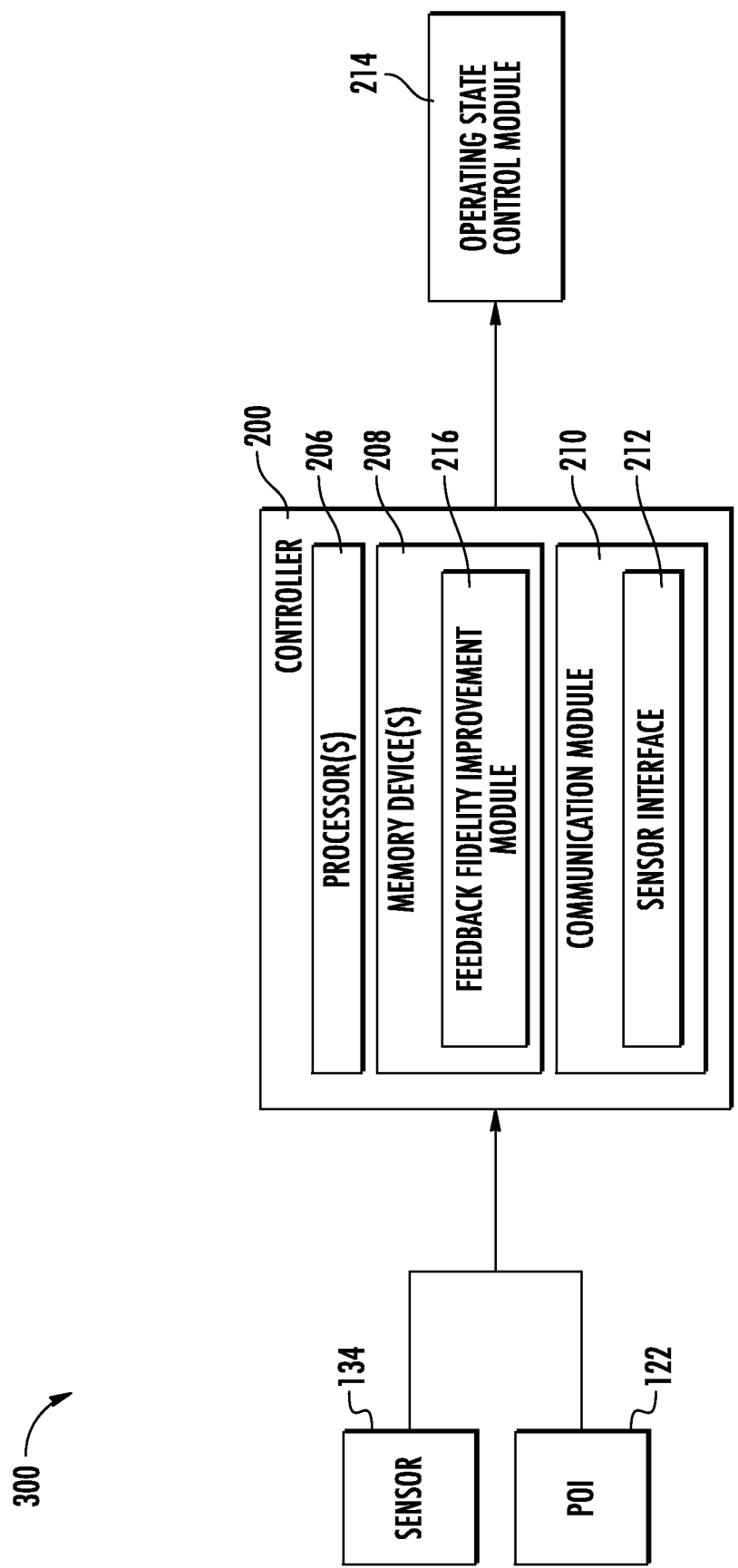
FIG. 4 illustrates a schematic diagram of one embodiment of a controller for use with the power generating system according to the present disclosure.

As depicted in FIGS. 2 and 3, in an embodiment, the power generating subsystem(s) 120 may be configured as the power generating asset 130. For example, the power generating asset 130 as described herein may be configured as a wind turbine 132, solar panels, hydroelectric facilities, tidal generators, waive generators, and/or fossil fuel generators. In such an embodiment, the power generating asset(s) 130 may be coupled to the POI 122 of the power generating facility 128 via communication links 124 and ultimately to the electrical grid 126.

As depicted in FIG. 3, each of the wind turbines 132 described herein generally includes a tower 102 extending from a support surface 104, a nacelle 106, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator (not shown) positioned within the nacelle 106 to permit electrical energy to be produced.

The power generating subsystem(s) 120 may also include a subsystem controller 200. For example, as shown in FIG. 3, when configured as a wind turbine 132, the subsystem controller 200 may be centralized within the nacelle 106. However, in other embodiments, the subsystem controller 200 may be located within any other component of the power generating subsystem(s) 120 or at a location outside the power generating subsystem(s) 120. Further, the subsystem controller 200 may be communicatively coupled to any number of the components of the power generating subsystem(s) 120 in order to control the components. As such, the subsystem controller 200 may include a computer or other suitable processing unit. Thus, in several embodiments, the subsystem controller 200 may include suitable computer-readable instructions that, when implemented, configure the subsystem controller 200 to perform various different functions, such as receiving, transmitting and/or executing setpoint commands.

Still referring to FIG. 3, one or more sensors 134 may be provided on the power generating subsystem(s) 120 to monitor the performance of the power generating subsystem(s) 120. It should also be appreciated that, as used herein, the term "monitor" and variations thereof indicates that the various sensors of the power generating subsystem(s) 120 may be configured to provide a direct measurement of the parameters being monitored or an indirect measurement of such parameters. Thus, the sensors described herein may, for example, be used to generate data signals indicative of an electrical parameter at the power generating subsystem(s) 120.

In an embodiment, the sensor(s) 134 may be configured as an operating condition sensor. For example, the sensor(s) 134 may be configured to monitor electrical parameters of the output of the power generating subsystem(s) 120. As such, the sensor(s) 134 may be a current sensor, voltage sensor, temperature sensors, power sensor, and/or frequency meter that monitors the electrical output of the power generating subsystem(s) 120. For example, the sensor(s) 134 may be configured to generate the data signals indicative of an electrical parameter relating to voltage, current, power, and/or frequency developed by the power generating subsystem(s) 120.

Referring now to FIGS. 1-5, depictions of multiple embodiments of a system 300 for controlling the power generating system 100 according to the present disclosure are presented. As shown particularly in FIG. 4, a schematic diagram of one embodiment of suitable components that may be included within the subsystem controller 200 is illustrated. For example, as shown, the subsystem controller 200 may include one or more processor(s) 206 and associated memory device(s) 208 configured to perform a variety of computer-implemented functions (e.g., performing the methods, steps, calculations and the like and storing relevant data as disclosed herein). Additionally, the subsystem controller 200 may also include a communications module 210 to facilitate communications between the subsystem controller 200 and the various components of the power generating subsystem(s) 120 and the POI 122. Further, the communications module 210 may include a sensor interface 212 (e.g., one or more analog-to-digital converters) to permit signals transmitted from the sensor(s) 134 to be converted into signals that can be understood and processed by the processors 206. It should be appreciated that the sensor(s) 134 may be communicatively coupled to the communications module 210 using any suitable means. For example, the sensor(s) 134 may be coupled to the sensor interface 212 via a wired connection. However, in other embodiments, the sensor(s) 134 may be coupled to the sensor interface 212 via a wireless connection, such as by using any suitable wireless communications protocol known in the art. Additionally, the communications module 210 may also be operably coupled to an operating state control module 214 configured to change at least one power generating asset operating state in response to the generation of a set point.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the subsystem controller 200 to perform various functions. The various functions may include, but are not limited to, obtaining data signals indicative of an electrical parameter at the POI 122 and the power generating subsystem(s) 120, generating a modeled value for the electrical parameter and generating a setpoint command based on the modeled value, as described herein, as well as various other suitable computer-implemented functions. In an embodiment the generation of the modeled value may be accomplished via a feedback fidelity improvement module 216 of the subsystem controller 200.

Figure 5:
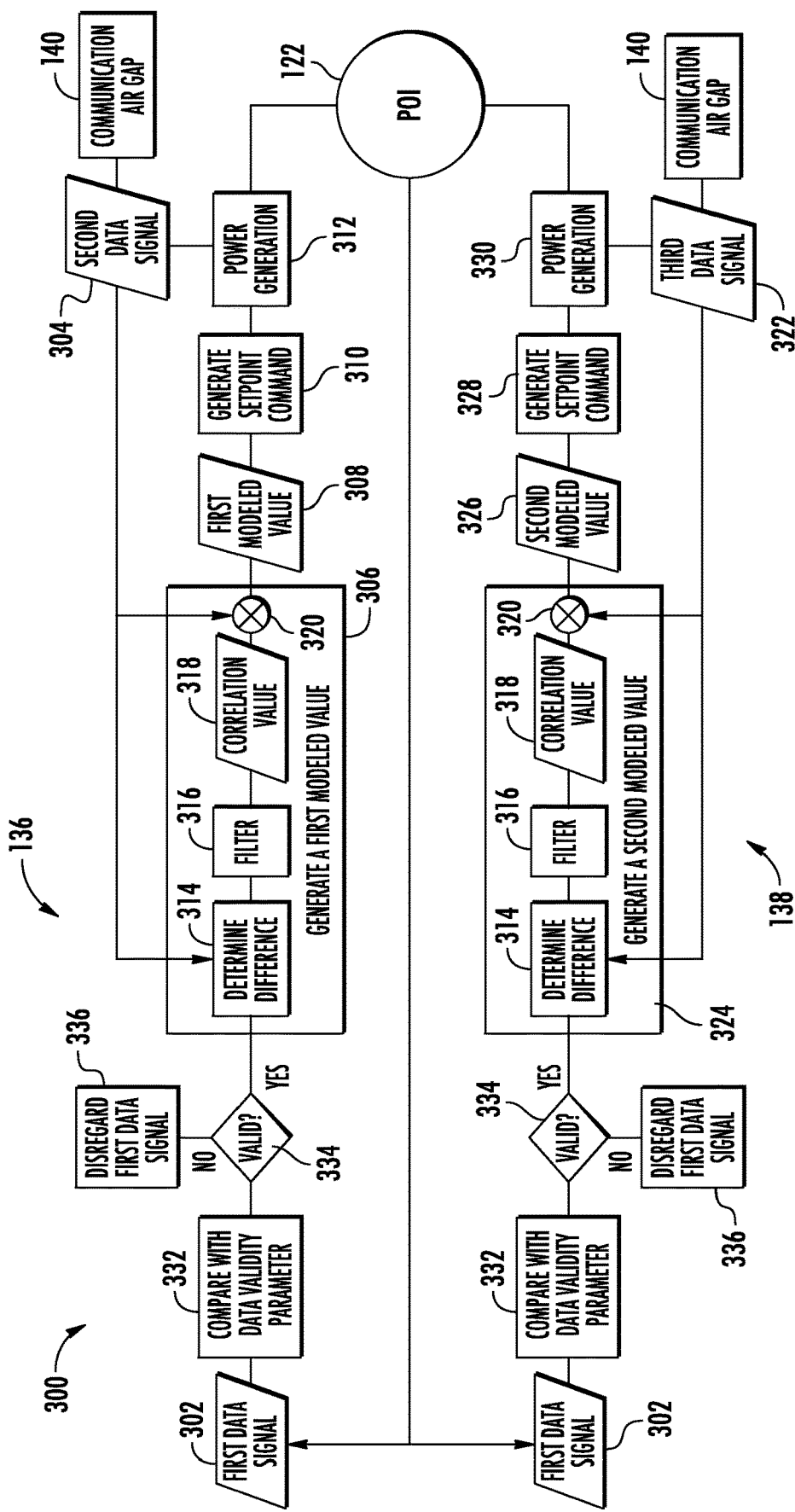
FIG. 5 illustrates a schematic diagram of one embodiment of control logic of a system for controlling a power generating system according to the present disclosure.

Referring still to FIGS. 1-5 and particularly to FIG. 5, in an embodiment, the subsystem controller 200 of the system 300 may be configured to obtain a first data signal 302 indicative of an electrical parameter at the POI 122. In an embodiment, wherein the power generating subsystem(s) 120 is configured as a power generating facility 128, such as a wind farm, a solar plant, a hydroelectric plant, or a hybrid power generation facility, the first data signal 302 may be received from the electrical grid 126. However, in an additional embodiment, wherein the power generating subsystem(s) 120 is configured as a power generating asset 130 rather than a power generating facility 128, the first data signal 302 may be received from the power generating facility 128 rather than the electrical grid 126. For example, in an embodiment, wherein the power generating subsystem(s) 120 is configured as a wind turbine 132, the first data signal 302 may be received from the wind farm of which the wind turbine 132 is a component thereof.

In an embodiment, the first data signal 302 may be a value for the electrical parameter measured at the POI 122 and may indicate the voltage, current, power, and/or frequency present at the POI 122. Accordingly, the first data signal 302 may reflect the combined effect of all of operating the power generating subsystems 120 electrically coupled to the POI 122 at a given time. For example, in an embodiment, the first data signal 302 may reflect the net voltage delivered to the POI 122 by each of the power generating subsystems 120 coupled thereto.

In an embodiment, the first data signal 302 may have a first signal fidelity. The first signal fidelity may be a measure of a refresh rate, a sensor accuracy, sensor resolution, and/or a communication delay. For example, the first data signal 302 may be transmitted by the POI 122 at a refresh rate exceeding 10 seconds. Accordingly, the subsystem controller 200 may receive an update reflecting the electrical parameter at the POI 122 once every 14 seconds, for example. In an embodiment, this may be considered to be a low-fidelity signal. It should be appreciated that a difference between the real-time electrical parameter values at the POI 122 and the latest reported electrical parameter values may develop and increase as the time elapsed since the last update from the POI 122 increases. In turn, this may result in the power generating subsystem(s) 120 operating at a point of lower efficiency than would be otherwise obtainable with a higher fidelity signal from the POI 122 (e.g. a signal refreshed at a significantly greater frequency). It should further be appreciated that the POI 122 and the power generating subsystem(s) 120 may be owned by different entities. As such, the power generating subsystem(s) 120 may have limited ability to affect the first signal fidelity in order to improve the operating efficiency of the power generating subsystem(s) 120.

Referring still in particular to FIG. 5, in an embodiment, the subsystem controller 200 of the system 300 may be configured to obtain a second data signal 304 indicative of the electrical parameter at the power generating subsystem(s) 120. The electrical parameter indicated by the second data signal 304 may be the same electrical parameter (e.g. voltage, current, power, and/or frequency) indicated by the first data signal 302, but with the value of the second data signal 304 reflecting the output of the power generating subsystem 120. It should therefore be appreciated that, the value of the second data signal 304 may be some portion of the value of the first data signal 302 for the same electrical parameter.

In an embodiment, the second data signal 304 may be received from the sensor(s) 134 and/or any other suitable component of the power generating subsystem(s) 120. Accordingly, the second data signal may have a second signal fidelity which is higher than the first signal fidelity. For example, in an embodiment, the sensor(s) 134 may generate the second data signal 304 at a refresh rate exceeding twice per second (e.g., a refresh rate of once every 40 milliseconds (ms)). As such, the subsystem controller 200 may receive the second data signal 304 indicating the output of the power generating subsystem 120 essentially continuously. It should be appreciated that due to the higher fidelity of the second data signal 304 the subsystem controller 200 may have a significantly more accurate understanding of the value of electrical parameter at the power generating subsystem 120 than at the POI 122 until such time as an updated first data signal is received by the subsystem controller 200. Therefore, while the subsystem controller 200 may have an accurate understanding of the performance/efficiency of the power generating subsystem 120, the subsystem controller 200, based solely on the first and second data signals 302, 304, may not have an accurate awareness of whether the power generating subsystem 120 is operating efficiently with respect to satisfying the requirements of the POI 122.

In order to utilize the first and second data signals 302, 304 to determine an efficient operating state for the power generating subsystem(s) 120, the subsystem controller 200 may, in an embodiment, be configured, at 306, to generate a first modeled value 308 for the electrical parameter at the POI 122. In an embodiment, the subsystem controller 200 may utilize the higher-fidelity second data signal 304 to compensate for the lower-fidelity first data signal 302 to generate the first modeled value 308. In other words, because the first data signal 302 may lack sufficient fidelity to support the efficient operation of the power generating subsystem(s) 120, the first modeled value 308 may simulate a value of the first data signal 302 which would be anticipated if the first data signal 302 was of a higher fidelity. This simulated value may then be utilized by the subsystem controller 200 control the power generating subsystem(s) 120.

In an embodiment, wherein the first signal fidelity is, for example, limited by the refresh rate of the first data signal 302 transmitted by the POI 122, the first data signal 302 accurately reflects the electrical parameter at the POI 122 only at the instant of transmission, with the accuracy of the reflection potentially decreasing until the next first data signal value is transmitted by the POI 122. Therefore, the higher-fidelity second data signal 304 may be employed to model/predict what the value of the first data signal 302 would have been in the interval between refreshes of the first data signal 302. For example, in an embodiment wherein the first data signal 302 has a refresh rate of 15 seconds and the second data signal 304 has a refresh rate of 50 ms, the first modeled value 308 may be computed in 50 ms intervals until a refreshed first data signal 302 is received after 15 seconds. In other words, because the second data signal 304 may be employed to improve the fidelity of the first data signal 302 in the periods between refreshes, the first data signal 302 may serve as a baseline for the system 300. It should be appreciated that while the preceding explanation was directed to fidelities correlating to the respective refresh rates, the concepts described herein apply equally to fidelities related to other modalities, such as sensor accuracy, sensor resolution, and/or communication delays.

Referring still in particular to FIG. 5, in an embodiment, the subsystem controller 200 may, at 310, generate a set point command for the power generating subsystem(s) 120 based, at least in part, on the first modeled value 308 for the electrical parameter. In response to the setpoint command, the power generating subsystem(s) 120 may, at 312, generate a quantity of power which may be measured by the sensor(s) 134 and/or a component of the power generating subsystem(s) 120.

As further depicted at 314 of FIG. 5, the subsystem controller 200 of the system 300 may, be configured to generate the first modeled value 308 by first determining a difference between the value of the first data signal 302 and the value of the second data signal 304. As the value of the first data signal 302 may reflect the net effects of each of the power generating subsystems 120 coupled to the POI 122, while the value of the second data signal reflects the power generation of a single power generating subsystem 120, in an embodiment, the value of the first data signal 302 may be greater than the value of the second data signal 304.

In an embodiment, as depicted at 316, the subsystem controller 200 may filter the difference between the first data signal 302 and the second data signal 304 to generate a correlation value 318. For example, in an embodiment, filtering the difference between the first data signal 302 and the second data signal 304, as determined at step 314, may include applying a lag filter to the difference. In an embodiment, filtering the difference between the first data signal 302 and the second data signal 304, as determined at step 314, may include applying a static (e.g., fixed time constant) lag filter, a dynamic (e.g., changing time constant) lag filter, an exponential filter, a bandpass filter, a low pass filter, a high pass filter, and/or a Kalman filter to the difference. In an embodiment, the subsystem controller 200 may, at 320, add the correlation value 318 to the second data signal 304 to establish the first modeled value 308 for the electrical parameter. The first modeled value 308 may simulate a value of the first data signal 302 having a higher fidelity.

Referring still to FIGS. 1-5, in an embodiment, the system 300 may include a plurality of power generating subsystems 120 coupled to the POI 122. For example, the system 300 may, in an embodiment, include a first power generating subsystem 136 and a second power generating subsystem 138. Each of the first and second power generating subsystems 136, 138 may include a subsystem controller 200. In such an embodiment, the first power generating subsystem 136 may utilize the steps described herein to generate a setpoint command based off the first modeled value 308. Additionally, the subsystem controller 200 of the second power generating subsystem 138 may be configured to obtain the same first data signal 302. However, the subsystem controller 200 of the second power generating subsystem 138 may also be configured to obtain a third data signal 322 indicative of the electrical parameter at the second power generating subsystem 138. The third data signal 322 may have a third signal fidelity that is higher than the first signal fidelity. In the same manner as the subsystem controller 200 for the first power generating subsystem 136, the subsystem controller 200 of the second power generating subsystem 138 may, at 324, generate a second modeled value 326 utilizing the steps described herein. The subsystem controller 200 for the second power generating subsystem 138 may, at 328, generate a setpoint command for the second power generating mode 138 based, at least in part, on the second modeled value 326 for the electrical parameter, thereby facilitating, at 330, power generation by the second power generating subsystem 138.

As further depicted in FIG. 5, in an embodiment, the first and second power generating subsystems 136, 138 may not be communicatively coupled with regards to the second and third data signals 304, 332. Accordingly, the third data signal 322 may be unknown to the first power generating subsystem 136 and the second data signal 304 may be unknown to the second power generating subsystem 138. In other words, while both the first and second power generating subsystems 136, 138 may receive the same broadcast of the first data signal 302, the first and second power generating subsystems 136, 138 may not communicate with each other the respective outputs of the sensors 134. Instead of requiring a communication link, the system 300 facilitates asynchronous control of the plurality of generating subsystems 120 by requiring each of the generating subsystems 120 to generate the respective setpoint commands based off of the respective modeled values, which are, in turn, baselined off of the broadcasted first data signal 302. By utilizing the first data signal 302 as a common feedback source under pending the respective modeled values for the control of the interconnected generating subsystems 120, high-speed, accurate, and coordinated control may be established between the plurality of generating subsystems 120 without requiring the sharing of information or commands between the generating subsystems 120. For example, in an embodiment wherein the plurality of generating subsystems 120 are configured as at least two windfarms, the system 300 does not require a communication link between the windfarms. It should be appreciated that the absence of a communication link between the windfarms may reduce/eliminate costs and/or complexities inherent in coordinating between the windfarms dispersed at a distance one another and/or operated by different entities. It should further be appreciated that the absence of a communication link between wind turbines of a wind farm may reduce/eliminate costs, complexities, and/or bandwidth requirements for a communication infrastructure of the wind farm.

It should further be appreciated that in an embodiment wherein the plurality of power generating subsystems 120 are communicatively decoupled from one another with regards to the data signals received from the respective sensors 134, the plurality of generating subsystems 120 may be communicatively coupled with regards to other aspects of power generation operations. For example, the plurality of generating subsystems 120 may be part of a distributed sensor network wherein readings from distributed environmental sensors are shared amongst the participants while still retaining separation with regards to the respective data signals.

In an embodiment wherein the plurality of power generating subsystems 120 are communicatively decoupled from one another with regards to the data signals received from the respective sensors 134, the plurality of power generating subsystems 120 may perform a droop-based control strategy when regulating the second modeled value. In an embodiment, a droop-based control strategy may include simulating the drooping characteristics of a traditional generator set. For example, in an embodiment wherein multiple communication line-free power generating subsystems 120 are connected in parallel, each power generating subsystem 120 may self-detect its own output electrical parameter. The output electrical parameter may then be adjusted relative to a reference output voltage amplitude and the frequency obtained by carrying out droop control. By employing a droop-based control strategy each power generating subsystem 120 may be able to adjust the electrical parameter, output active power and reactive power, automatically, and participate in the regulation of grid voltage and frequency.

Referring back to FIG. 1, in an embodiment, the communicative decoupling between the plurality of generating subsystems 120 may be considered to be a communication airgap 140. In an embodiment, the establishment of the communication airgap 140 between the first and second power generating subsystems 136, 138 may enhance a cybersecurity posture of the respective power generating subsystems 120 relative to communicatively coupled power generating subsystems. The cybersecurity posture of the power generating subsystems 120 may indicate the relative vulnerability of the power generating subsystems to a cyberattack. Accordingly, reducing, or eliminating, communication access points to the power generating subsystem(s) 120 may reduce a number of possible avenues for intrusion and thereby increase the cybersecurity posture of the power generating subsystem(s) 120.

Referring back to FIG. 5, in an embodiment, the subsystem controller 200 of the system 300 may be configured, at 332, to compare the first data signal 302 to at least one data validity parameter. For example, in an embodiment, the data validity parameter may include a range of acceptable values of the first data signal, a required refresh interval, a required signal quality, and/or any other combination of parameters selected to indicate a validity state of the first data signal 302. In an embodiment wherein the comparison, at 334, indicates that the first data signal 302 is invalid, the subsystem controller 200 may, at 336, disregard the first data signal 302. In such an embodiment, the subsystem controller 200 may be configured to generate the modeled value using the last known valid first data signal 302. In an additional embodiment, the subsystem controller 200 may be configured to utilize a default first data signal 302 until such time as a valid first data signal 302 may be received.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for controlling a power generating system, the power generating system comprising at least one power generating subsystem connected to a point of interconnection, the method comprising: obtaining, with a subsystem controller of the power generating subsystem, a first data signal indicative of an electrical parameter at the point of interconnection, the first data signal having a first signal fidelity; obtaining, with the subsystem controller, a second data signal indictive of the electrical parameter at the generating asset, the second data signal having a second signal fidelity that is higher than the first signal fidelity; generating, with the subsystem controller, a first modeled value for the electrical parameter at the point of interconnection by utilizing the higher-fidelity second data signal to compensate for the lower-fidelity first data signal; and generating, with the subsystem controller, a setpoint command for the power generating subsystem based, at least in part, on the first modeled value for the electrical parameter.

Clause 2. The method of claim 1, wherein generating the first modeled value for the electrical parameter further comprises: determining, with the subsystem controller, a difference between a value of the first data signal and a value of the second data signal; filtering, with the subsystem controller, the difference to generate a correlation value; and adding the correlation value to the value for the electrical parameter indicated by the second data signal to establish the first modeled value for the electrical parameter.

Clause 3. The method of any preceding claim, wherein the at least one power generating subsystem is a first power generating subsystem, wherein the power generating system comprises a second power generating subsystem connected to the point of interconnection, the method further comprising: obtaining the first data signal with a subsystem controller of the second power generating subsystem; obtaining, with the subsystem controller of the second power generating subsystem, a third data signal indicative of the electrical parameter at the second generating asset, the third data signal having a third signal fidelity that is higher than the first signal fidelity; generating, with the subsystem controller for the second power generating subsystem, a second modeled value for the electrical parameter at the point of interconnection by utilizing the higher-fidelity third data signal to compensate for the lower-fidelity first data signal; and generating, with the subsystem controller for the second power generating subsystem, a setpoint command for the second power generating subsystem based, at least in part, on the second modeled value for the electrical parameter.

Clause 4. The method of any preceding clause, wherein the first and second power generating subsystems are not communicatively coupled with regards to the second and third data signals such that the third data signal is unknown to the first power generating subsystem and the second data signal is unknown to the second power generating subsystem.

Clause 5. The method of any preceding clause, further comprising: establishing a communication air gap between the first and second power generating subsystems, wherein establishing the communication air gap enhances an cybersecurity posture of the first and second power generating subsystems relative to communicatively coupled power generating subsystems.

Clause 6. The method any preceding clause, wherein the at least one power generating subsystem comprises a wind farm, and wherein the first data signal is obtained from a electrical grid.

Clause 7. The method any of preceding clause, wherein the at least one power generating subsystem comprises at least one wind turbine of a wind farm, and wherein the first data signal is obtained from the windfarm.

Clause 8. The method of any preceding clause, further comprising: comparing the first data signal to at least one data validity parameter; and disregarding the first data signal when the comparison indicates the first data signal is invalid.

Clause 9. The method of any preceding clause, wherein the first and second signal fidelities comprise a measure of at least one of a refresh rate, a sensor accuracy, a sensor resolution, or a communication delay.

Clause 10. The method of any preceding clause, wherein the electrical parameter comprises at least one of voltage, current, power, or frequency.

Clause 11. A system for controlling a power generating system, the system comprising: at least one power generating subsystem connected to a point of interconnection; and a subsystem controller of the at least one power generating subsystem, the subsystem controller comprising at least one processor configured to perform a plurality of operations, the plurality of operations comprising: obtaining a first data signal indicative of an electrical parameter at the point of interconnection, the first data signal having a first signal fidelity, obtaining a second data signal indictive of the electrical parameter at the generating asset, the second data signal having a second signal fidelity that is higher than the first signal fidelity, generating a first modeled value for the electrical parameter at the point of interconnection by utilizing the higher-fidelity second data signal to compensate for the lower-fidelity first data signal, and generating a setpoint command for the power generating subsystem based, at least in part, on the first modeled value for the electrical parameter.

Clause 12. The system of any preceding clause, wherein generating the first modeled value for the electrical parameter further comprises: determining a difference between a value of the first data signal and a value of the second data signal; filtering the difference to generate a correlation value; and adding the correlation value to the value for electrical parameter indicated by the second data signal to establish the first modeled value for the electrical parameter, wherein the electrical parameter comprises at least one of voltage, current, power, or frequency.

Clause 13. The system of any preceding clause, wherein the at least one power generating subsystem is a first power generating subsystem, wherein the subsystem controller is a subsystem controller of the first power generating subsystem, wherein the power generating system further comprises a second power generating subsystem connected to the point of interconnection, the system comprising: a subsystem controller of the second power generating subsystem, the subsystem controller of the second power generating subsystem comprising at least one processor configured to perform a plurality of operations, the plurality of operations comprising: obtaining the first data signal, obtaining, a third data signal indicative of the electrical parameter at the second generating asset, the third data signal having third signal fidelity that is higher than the first signal fidelity, wherein the first and second power generating subsystems are not communicatively coupled with regards to the second and third data signals such that the third data signal is unknown to the first power generating subsystem and the second data signal is unknown to the second power generating subsystem, generating a second modeled value for the electrical parameter at the point of interconnection by utilizing the higher-fidelity third data signal to compensate for the lower-fidelity first data signal, and generating a setpoint command for the second power generating subsystem based, at least in part, on the second modeled value for the electrical parameter.

Clause 14. The system of any preceding clause, further comprising: a communication air gap between the first and second power generating subsystems, wherein the communication air gap enhances an cybersecurity posture of the first and second power generating subsystems relative to communicatively coupled power generating subsystems.

Clause 15. The system of any preceding clause, wherein the at least one power generating subsystem comprises a wind farm, and wherein the first data signal is obtained from a electrical grid.

Clause 16. The system of any preceding clause, wherein the at least one power generating subsystem comprises at least one of a solar power plant, a hydroelectric plant, or a hybrid power generation facility, and wherein the first data signal is obtained from a electrical grid.

Clause 17. The system of any preceding clause, wherein the plurality of operations further comprise: comparing the first data signal to at least one data validity parameter; and disregarding the first data signal when the comparison indicates the first data signal is invalid.

Clause 18. A method for controlling a wind farm, the wind farm comprising at least a first wind turbine and a second wind turbine connected to a point of interconnection, the method comprising: obtaining, with a subsystem controller of each wind turbine, a first data signal indicative of an electrical parameter at the point of interconnection, the first data signal having a first signal fidelity; obtaining, with the subsystem controller of the first wind turbine, a second data signal indicative of the electrical parameter at the first wind turbine, the second data signal having a second signal fidelity that is higher than the first signal fidelity; obtaining, with the subsystem controller of the second wind turbine, a third data signal indicative of the electrical parameter at the second wind turbine, the third data signal having a third signal fidelity that is higher than the first signal fidelity, wherein the first and second wind turbines are not communicatively coupled with regards to the second and third data signals such that the third data signal is unknown to the first wind turbine and the second data signal is unknown to the second wind turbine generating, with the subsystem controller of the first wind turbine, a first modeled value for the electrical parameter at the point of interconnection by utilizing the higher-fidelity second data signal to compensate for the lower-fidelity first data signal; generating, with the subsystem controller of the second wind turbine, a second modeled value for the electrical parameter at the point of interconnection by utilizing the higher-fidelity third data signal to compensate for the lower-fidelity first data signal; generating, with the subsystem controller of the first wind turbine, a setpoint command based, at least in part, on the first modeled value for the electrical parameter; and generating, with the subsystem controller of the second wind turbine, a setpoint command based, at least in part, on the second modeled value for the electrical parameter.

Clause 19. The method of any preceding clause, wherein generating the first and second modeled values for the electrical parameter further comprises: determining, with the subsystem controller of the first wind turbine, a difference between a value of the first data signal and a value of the second data signal; filtering, with the subsystem controller of the first wind turbine, the difference to generate a first correlation value relative to the first wind turbine; adding the first correlation value to the value for electrical parameter indicated by the second data signal to establish the first modeled value for the electrical parameter; determining, with the subsystem controller of the second wind turbine, a difference between a value of the first data signal and/or value of the third data signal; filtering, with the subsystem controller of the second wind turbine, the difference to generate a second correlation value relative to the second wind turbine; and adding the second correlation value to the value for the electrical parameter indicated by the third data signal to establish the second modeled value for the electrical parameter.

Clause 20. The method of any preceding clause, further comprising: establishing a communication air gap between the first and second power generating subsystems, wherein establishing the communication air gap enhances an cybersecurity posture of the first and second power generating subsystems relative to communicatively coupled power generating subsystems.

What is claimed is:

1. A method for controlling a power generating system, the power generating system comprising at least one power generating subsystem connected to a point of interconnection, the method comprising:
    obtaining, with a subsystem controller of the power generating subsystem, a first data signal indicative of an electrical parameter at the point of interconnection, the first data signal having a first signal fidelity;
    obtaining, with the subsystem controller, a second data signal indictive of the electrical parameter at the generating subsystem, the second data signal having a second signal fidelity that is higher than the first signal fidelity;
    generating, with the subsystem controller, a first modeled value for the electrical parameter at the point of interconnection by utilizing the higher-fidelity second data signal to compensate for the lower-fidelity first data signal; and
    generating, with the subsystem controller, a setpoint command for the power generating subsystem based, at least in part, on the first modeled value for the electrical parameter.

2. The method of claim 1, wherein generating the first modeled value for the electrical parameter further comprises:
    determining, with the subsystem controller, a difference between a value of the first data signal and a value of the second data signal;
    filtering, with the subsystem controller, the difference to generate a correlation value; and
    adding the correlation value to the value for the electrical parameter indicated by the second data signal to establish the first modeled value for the electrical parameter.

3. The method of claim 1, wherein the at least one power generating subsystem is a first power generating subsystem, wherein the power generating system comprises a second power generating subsystem connected to the point of interconnection, the method further comprising:
obtaining the first data signal with a subsystem controller of the second power generating subsystem;
obtaining, with the subsystem controller of the second power generating subsystem, a third data signal indicative of the electrical parameter at the second generating subsystem, the third data signal having a third signal fidelity that is higher than the first signal fidelity;
generating, with the subsystem controller for the second power generating subsystem, a second modeled value for the electrical parameter at the point of interconnection by utilizing the higher-fidelity third data signal to compensate for the lower-fidelity first data signal; and
generating, with the subsystem controller for the second power generating subsystem, a setpoint command for the second power generating subsystem based, at least in part, on the second modeled value for the electrical parameter.

4. The method of claim 3, wherein the first and second power generating subsystems are not communicatively coupled with regards to the second and third data signals such that the third data signal is unknown to the first power generating subsystem and the second data signal is unknown to the second power generating subsystem.

5. The method of claim 4, further comprising:
establishing a communication air gap between the first and second power generating subsystems, wherein establishing the communication air gap enhances a cybersecurity posture of the first and second power generating subsystems relative to communicatively coupled power generating subsystems.

6. The method of claim 1, wherein the at least one power generating subsystem comprises a wind farm, and wherein the first data signal is obtained from a electrical grid.

7. The method of claim 1, wherein the at least one power generating subsystem comprises at least one wind turbine of a windfarm, and wherein the first data signal is obtained from the windfarm.

8. The method of claim 1, further comprising:
comparing the first data signal to at least one data validity parameter; and
disregarding the first data signal when the comparison indicates the first data signal is invalid.

9. The method of claim 1, wherein the first and second signal fidelities comprise a measure of at least one of a refresh rate, a sensor accuracy, a sensor resolution, or a communication delay.

10. The method of claim 1, wherein the electrical parameter comprises at least one of voltage, current, power, or frequency.

11. A system for controlling a power generating system, the system comprising:
at least one power generating subsystem connected to a point of interconnection; and
a subsystem controller of the at least one power generating subsystem, the subsystem controller comprising at least one processor configured to perform a plurality of operations, the plurality of operations comprising:
obtaining a first data signal indicative of an electrical parameter at the point of interconnection, the first data signal having a first signal fidelity,
obtaining a second data signal indictive of the electrical parameter at the generating subsystem, the second data signal having a second signal fidelity that is higher than the first signal fidelity,
generating a first modeled value for the electrical parameter at the point of interconnection by utilizing the higher-fidelity second data signal to compensate for the lower-fidelity first data signal, and
generating a setpoint command for the power generating subsystem based, at least in part, on the first modeled value for the electrical parameter.

12. The system of claim 11, wherein generating the first modeled value for the electrical parameter further comprises:
determining a difference between a value of the first data signal and a value of the second data signal;
filtering the difference to generate a correlation value; and
adding the correlation value to the value for electrical parameter indicated by the second data signal to establish the first modeled value for the electrical parameter, wherein the electrical parameter comprises at least one of voltage, current, power, or frequency.

13. The system of claim 11, wherein the at least one power generating subsystem is a first power generating subsystem, wherein the subsystem controller is a subsystem controller of the first power generating subsystem, wherein the power generating system further comprises a second power generating subsystem connected to the point of interconnection, the system comprising:
a subsystem controller of the second power generating subsystem, the subsystem controller of the second power generating subsystem comprising at least one processor configured to perform a plurality of operations, the plurality of operations comprising:
obtaining the first data signal,
obtaining, a third data signal indicative of the electrical parameter at the second generating subsystem, the third data signal having third signal fidelity that is higher than the first signal fidelity, wherein the first and second power generating subsystems are not communicatively coupled with regards to the second and third data signals such that the third data signal is unknown to the first power generating subsystem and the second data signal is unknown to the second power generating subsystem,
generating a second modeled value for the electrical parameter at the point of interconnection by utilizing the higher-fidelity third data signal to compensate for the lower-fidelity first data signal, and
generating a setpoint command for the second power generating subsystem based, at least in part, on the second modeled value for the electrical parameter.

14. The system of claim 13, further comprising:
a communication air gap between the first and second power generating subsystems, wherein the communication air gap enhances an cybersecurity posture of the first and second power generating subsystems relative to communicatively coupled power generating subsystems.

15. The system of claim 11, wherein the at least one power generating subsystem comprises a wind farm, and wherein the first data signal is obtained from a electrical grid.

16. The system of claim 11, wherein the at least one power generating subsystem comprises at least one of a solar power plant, a hydroelectric plant, or a hybrid power generation facility, and wherein the first data signal is obtained from a electrical grid.

17. The system of claim 11, wherein the plurality of operations further comprise:
- comparing the first data signal to at least one data validity parameter; and
- disregarding the first data signal when the comparison indicates the first data signal is invalid.

18. A method for controlling a wind farm, the wind farm comprising at least a first wind turbine and a second wind turbine connected to a point of interconnection, the method comprising:
- obtaining, with a subsystem controller of each wind turbine, a first data signal indicative of an electrical parameter at the point of interconnection, the first data signal having a first signal fidelity;
- obtaining, with the subsystem controller of the first wind turbine, a second data signal indicative of the electrical parameter at the first wind turbine, the second data signal having a second signal fidelity that is higher than the first signal fidelity;
- obtaining, with the subsystem controller of the second wind turbine, a third data signal indicative of the electrical parameter at the second wind turbine, the third data signal having a third signal fidelity that is higher than the first signal fidelity, wherein the first and second wind turbines are not communicatively coupled with regards to the second and third data signals such that the third data signal is unknown to the first wind turbine and the second data signal is unknown to the second wind turbine;
- generating, with the subsystem controller of the first wind turbine, a first modeled value for the electrical parameter at the point of interconnection by utilizing the higher-fidelity second data signal to compensate for the lower-fidelity first data signal;
- generating, with the subsystem controller of the second wind turbine, a second modeled value for the electrical parameter at the point of interconnection by utilizing the higher-fidelity third data signal to compensate for the lower-fidelity first data signal;
- generating, with the subsystem controller of the first wind turbine, a setpoint command based, at least in part, on the first modeled value for the electrical parameter; and
- generating, with the subsystem controller of the second wind turbine, a setpoint command based, at least in part, on the second modeled value for the electrical parameter.

19. The method of claim 18, wherein generating the first and second modeled values for the electrical parameter further comprises:
- determining, with the subsystem controller of the first wind turbine, a difference between a value of the first data signal and a value of the second data signal;
- filtering, with the subsystem controller of the first wind turbine, the difference to generate a first correlation value relative to the first wind turbine;
- adding the first correlation value to the value for electrical parameter indicated by the second data signal to establish the first modeled value for the electrical parameter;
- determining, with the subsystem controller of the second wind turbine, a difference between a value of the first data signal and/or value of the third data signal;
- filtering, with the subsystem controller of the second wind turbine, the difference to generate a second correlation value relative to the second wind turbine; and
- adding the second correlation value to the value for the electrical parameter indicated by the third data signal to establish the second modeled value for the electrical parameter.

20. The method of claim 18, further comprising:
- establishing a communication air gap between the first and second power generating subsystems, wherein establishing the communication air gap enhances an cybersecurity posture of the first and second power generating subsystems relative to communicatively coupled power generating subsystems.

* * * * *